United States Patent [19]
Tschirky et al.

[11] 3,936,247
[45] Feb. 3, 1976

[54] FLOATING FLOW RESTRICTORS FOR FLUID MOTORS

[75] Inventors: John E. Tschirky, Long Beach; Gary Monroe Crase, Cypress, both of Calif.

[73] Assignee: Smith International, Inc., Newport Beach, Calif.

[22] Filed: Jan. 27, 1975

[21] Appl. No.: 544,353

Related U.S. Application Data

[63] Continuation-in-part of Ser. Nos. 388,586, Aug. 15, 1973, Pat. No. 3,879,094, and Ser. No. 433,284, Jan. 14, 1974, Pat. No. 3,912,425.

[52] U.S. Cl. .................. 418/48; 418/102; 175/107; 175/320; 175/337; 308/4 A
[51] Int. Cl.² .. F01C 1/10; F01C 21/04; E23B 3/12; E23B 17/00
[58] Field of Search ............ 418/48, 102; 417/372; 175/107, 337, 320; 308/4 A, 122

[56] References Cited
UNITED STATES PATENTS

| | | | |
|---|---|---|---|
| 2,308,316 | 1/1943 | Smith et al. | 308/4 A |
| 3,112,801 | 12/1963 | Clark et al. | 175/107 |
| 3,456,746 | 7/1969 | Garrison et al. | 175/320 |
| 3,489,231 | 1/1970 | Garrison et al. | 418/48 |
| 3,516,718 | 6/1970 | Garrison et al. | 308/230 |

FOREIGN PATENTS OR APPLICATIONS

781,860  8/1957  United Kingdom ............. 415/502

*Primary Examiner*—John J. Vrablik
*Attorney, Agent, or Firm*—Philip Subkow

[57] ABSTRACT

This invention relates to flow restrictors in fluid motors where the operating fluid also passes through the bearings of the motor.

19 Claims, 14 Drawing Figures

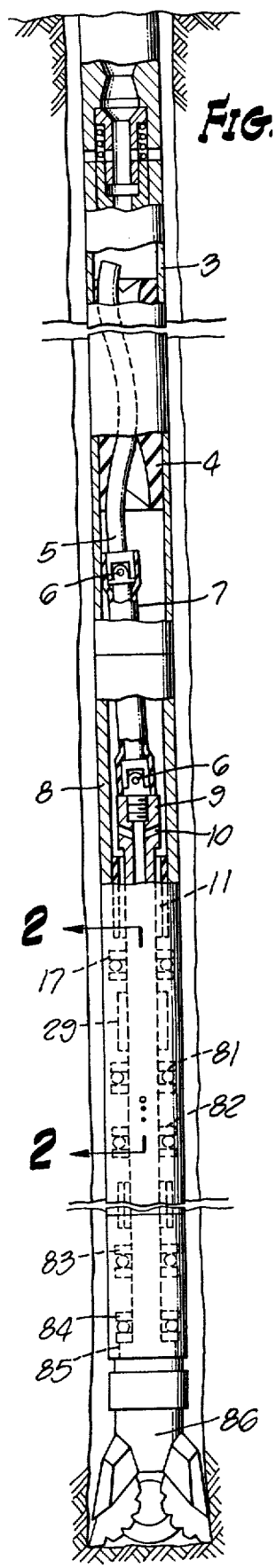
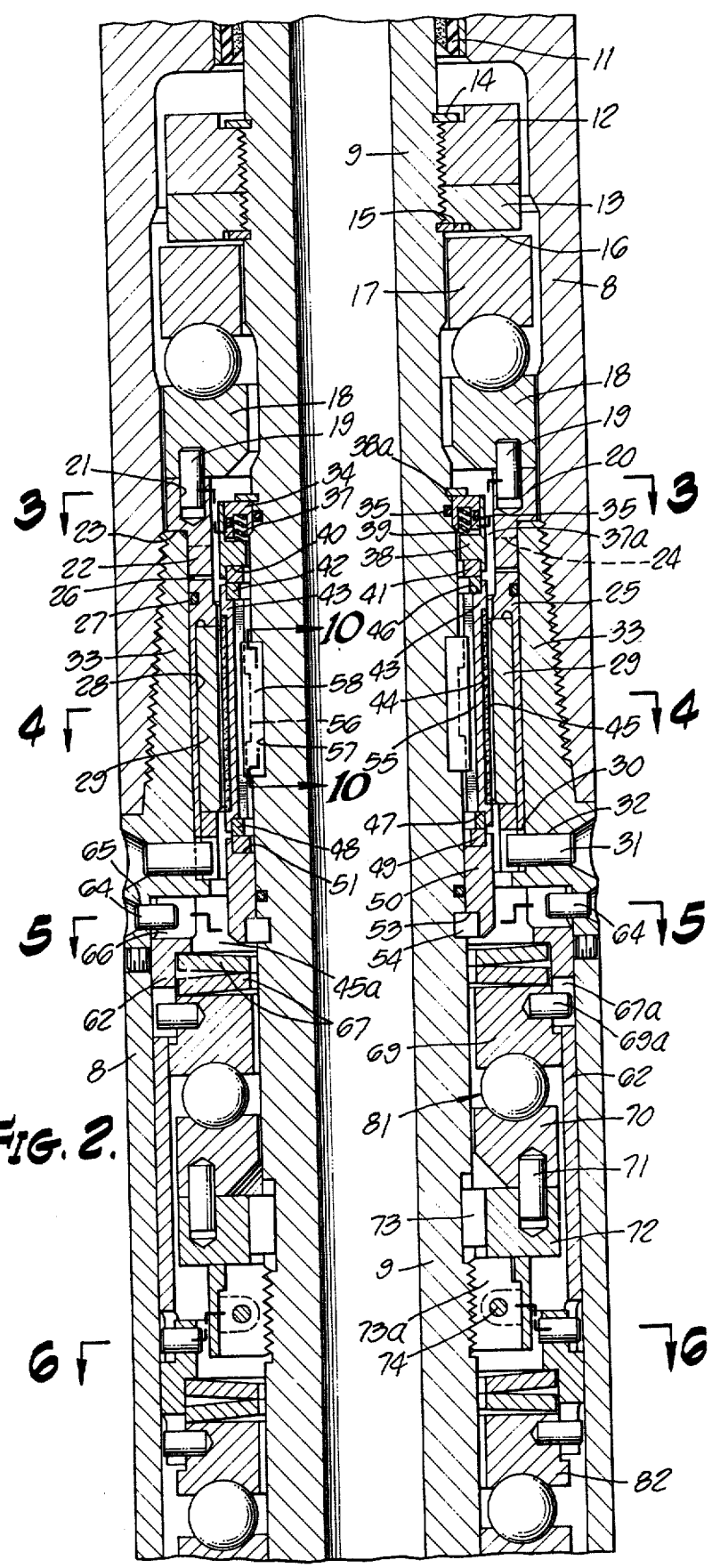
Fig. 1.
Fig. 2.

3,936,247

FLOATING FLOW RESTRICTORS FOR FLUID MOTORS

This application is a continuation in part of applications Ser. No. 388,586 filed Aug. 15, 1973, now U.S. Pat. No. 3,879,094 and Ser. No. 433,284 filed Jan. 14, 1974, now U.S. Pat. No. 3,912,425

BACKGROUND OF THE INVENTION

The use of motors in bore hole drilling, especially in drilling for oil and gas but also in mining operations, has been a standard procedure in the art. Such motors are employed to rotate drills for boring in the earth both for forming a bore hole and also for coring. The motors are also useful in oil field operations, such as tube cleaning, milling operations, cement drilling and other operations where it is desired to rotate a rod at the end of which a tool is to be rotated. We refer to such motors as in-hole drills when designed to be run at the end of a pipe and adjacent to the drill bit. In the usual case, the rotor of the motor and the drill bit rotate with respect to a stator which, in turn, is connected to a conventional drill string composed, in the case of the drilling of well bores, of a "kelly," drill pipe and drill collar as required. This string extends to the surface with the kelly mounted in the rotary table. Where the in-hole motor is a hydraulic motor used as an in-hole motor in drilling, the liquid is the usual drilling fluid, i.e., mud or gas. It serves its usual function in the drilling operation, returning to the surface carrying the detritus, i.e., cuttings resulting from the drilling operation. However, in this combination, the circulating mud has an additional function and that is to supply the hydraulic power to operate the hydraulic motor.

One of the primary problems resides in the design of the bearing system which will permit operations for period of economic length.

It has been conventional to rely on a part of the circulating mud to pass through the bearings to lubricate them. Such bearing systems are shown in E. P. Garrison et al, U.S. Pat. No. 3,516,718, issued January 23, 1970, and in Garrison et al, U.S. Pat. No. 3,456,746. Mud lubrication of bearings has also been applied to turbine-operated drills of the prior art.

When mud-lubricated bearings are employed with motors of the helicoidal type, such as have been employed in the prior art in-hole motors, problems arise with respect to limiting the flow of mud through the bearings and problems arise from the eccentric motion of the rotor. Such motors are shown in Clark U.S. Pat. No. 3,112,801, patented Dec. 3, 1963, and have been widely distributed by Smith International, Inc. under their registered trademark "Dyna-Drill." Such motors are described in the article by H. M. Rollins, "Bit Guiding Tools Provide Better Control of Directional Drills," World Oil, June, 1966, pages 124-135, and are also discussed below.

The prior art solutions for limiting the bypass of mud through the bearings are shown in the Garrison patents. These include the provision of a grooved rubber radial bearing which also acts as a flow restrictor to limit the fluid bypassing through the bearings so as not to rob unduly the main flow through the bit nozzles required to provide the necessary flow to remove the cuttings.

Since the rotor of the motor rotates in an eccentric manner, it is necessary to convert this motion into a true rotation about a fixed axis so that the bit may be rotated in the proper manner. This is accomplished by connecting the end of the rotor to a connecting rod by means of a universal joint and connecting the connecting rod to a drive shaft by means of a second universal joint.

Further, while the universal joints do a fairly good job in the case of the helicoidal motors of converting the eccentric motion of the rotor to a rotary motion, there remains a residual force on the drive shaft which is transverse to the axis of rotation. This transverse force is periodic in direction, reversing itself on each reversal of the eccentric motion. Additionally, when drilling in steeply dipping formations or in drilling out dog legs, or in drilling deviated holes, particularly when using bent subs at the connecting rod, a thrust is encountered at the bit which is transverse to the bit axis. The result is a transverse displacement of the shaft, and a transverse force applied to the radial bearing employed; for example, the rubber bearing referred to or any other radial bearing which may be employed.

Problems have arisen in such prior art combination. The rubber radial bearings, which even in the first place, due to molding limitations, do not act adequately to restrict the amount of bypass, deteriorate in use and result in premature failure. This failure includes erosion of the bearing passageways where the grooves are washed out.

Circulating mud usually contains fine particles of "sand" resulting from the drilling operation. The mud returning up the annulus is separated from the cuttings, but some fine particles produced by the drilling operation escape in the treated mud. The returning mud passing at high volumetric velocity through the grooves in the rubber flow restrictor erodes the grooves. The result is that the pressure drop through the restrictor is reduced and a large portion of the input mud is bypassed.

The percentage of the fluid bypassed, even with newly formed radial rubber bearings, may be excessive because it is difficult to mold such bearings to form passageways through the bearings that will have the desired flow resistance and yet provide a suitable bearing surface which will not have excessive frictional resistance. The erosion of the rubber by the mud is also a problem.

Experience has shown that the normal marine bearing employed as a radial bearing permits of an excessive flow through the bearing flutes, under the above flow conditions. Such flow rates may range up to about 20% of the total volumetric flow rates. This is an excessive bypass flow. In order to reduce the flow, a separate flow restrictor is added, as is shown in the above Garrison U.S. Pat. No. 3,456,746. This may reduce the flow in the range of about 5 to 10% of the total flow, depending on the magnitude of the volumetric flow rate of the mud. The percentage of the bypass being the greater, the larger is the volumetric flow rate.

It is to be recognized that pressures drop between the stator discharge to the annulus exterior of the drill may be of the order 200 to 1500 pounds per square inch and a volumetric rate of flow from 50 to about 600 gallons per minute, depending upon the depth, nature of the mud, size of the tool, and designs of the nozzles of the bit.

Excessive bypass flow through the bearing system imposes excessive erosion of the thrust bearings. A bypass flow has been experienced, in the prior art, of about 5 to about 30 gallons, that is, about 5 to about 10% of the volumetric flow rate in the range of the pressure drops referred to above. The increase in volume flow through the marine bearing, flow restrictor, and thrust-bearing packages may thus rise to excessive magnitude.

The pressure drop and volume rate of flow of the mud through the stator depend on the horsepower requirement and drill and rpm of the drilling effort. This establishes the gallons per minute of mud that must be circulated. The mud input pressure is fixed by the total pressure drop through the drill string, the hydraulic motor, bit nozzle and annulus pressure drop. The volume bypassed through the bearings is subtracted from the flow through the nozzles. The pump must provide for sufficient input to supply the required flow rate and pressure drop. The bit manufacturer usually supplies the nozzle pressure drop to give the required lifting effect and cutting action. Furthermore, the depth to which a well may be serviced by a given pump assembly and therefore the limit of bit advance depend on the permissible horsepower required to move the mud through the motor to and through the bit nozzles and return the cuttings to the surface. Any additional demand on the pump, required to supply excessive by-pass, is a limitation on the depth to which a given drilling rig can go. Additional pump capacity is thus required.

It is difficult to build a rubber bearing which is so finely tuned as to meet these parameters and not permit an excessive flow through the bearings. Furthermore, as has been stated above, pressure drops tend to erode the passageways in the rubber bearing so that they do not for long retain their original cross-sectional areas.

STATEMENT OF THE INVENTION

It is the object of our invention to improve the operation of hydraulic motors employing fluted radial bearings by employing stable flow restrictors having hardness values which will resist erosion by abrasive particles present in the fluid used to lubricate the bearing package. Such hydraulic motors include the positive displacement type referred to above or the turbine type known as the turbo drill.

In our co-pending application we employed, instead of rubber radial bearings of the marine bearing types, radial bearings made of ceramic and hard material such as tungsten carbide. Such bearings were relied on in said application to act as flow conductors. While we may use such radial bearings, we do not in the present invention rely on such bearings to constitute the metering function; and we need not, therefore, use a passageway of the small dimension which is required to provide a metering function. This simplifies the construction of the radial bearing.

In our invention, we provide a flow restrictor constructed of similar hard materials and designed to maintain stable dimensions and stable restriction to flow. We may thus use the rubber marine bearings of the prior art as radial bearings, including suitably large passageways to limit the volumetric flow rates so as to limit the erosion of the flutes in the marine bearing. Since when using the marine bearing we rely primarily on its function as a radial bearing, any increase in size of the flutes by erosion which does not result in a destruction of the radial bearing function does not materially influence the operation of the motor.

The flow restrictor of our invention is, by reason of its composition, resistant to erosion, and its dimensional stability is aided by the mechanical construction.

The restrictor of our invention maintains a stable bypass volume despite any transverse movement of the shaft. The restrictor is formed of a floating sleeve mounted on the shaft and spaced from a stationary sleeve mounted on the housing of the motor and between the shaft housing. The space between the sleeves forms a flow passageway of substantially stable cross-sectional area. The sleeve mounted on said shaft is termed floating, in the sense that it is mounted so that the shaft may be displaced radially with respect to the floating sleeve. The mounting provides an annular space between the shaft and the sleeve.

In our preferred embodiment, the cooperating faces of the sleeves are made of material having a hardness greater than that in the cuttings which may be contained in the circulating mud.

Provision is made for a relatively large radial displacement of the shaft before impact forces are applied to the cooperating surfaces of the flow restrictor. When the surface of the flow restrictor channel is formed of relatively non-elastic material such as is preferred and as is described below, the provision of a substantial play of the shaft before impact on the flow restrictor prolongs the life and function of the flow restrictor. The flow restrictor of my invention is not relied on to provide any bearing function.

This invention will be further described by reference to the drawings, of which:

FIG. 1 is a schematic view of one application of my invention.

FIG. 2 is a sectional view on line 2—2 of FIG. 1.

Figure 3:
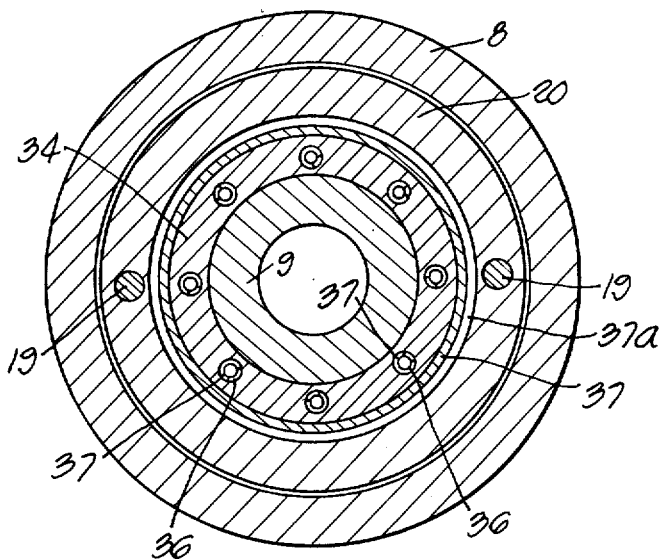
FIG. 3 is a sectional view on line 3—3 of FIG. 2.
Figure 5:
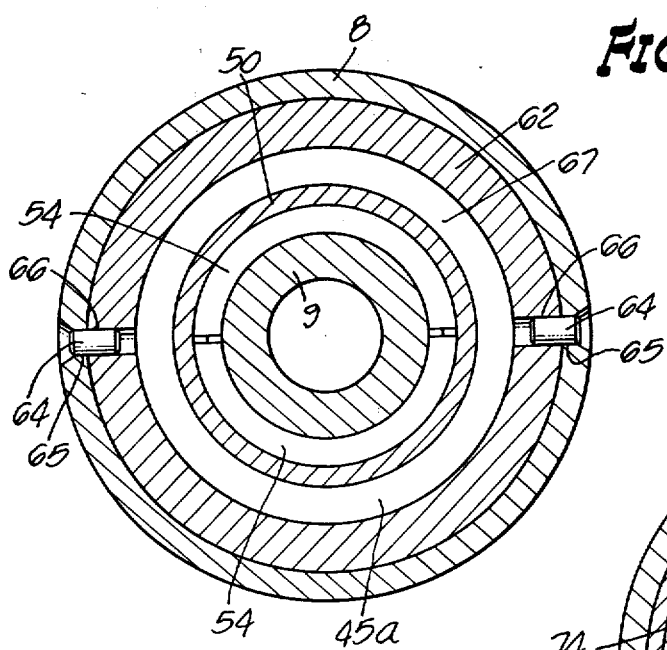
FIG. 5 is a sectional view on line 5—5 of FIG. 2.

FIG. 1 shows the conventional assembly of a progressing cavity motor used to operate a drill in a bore hole. The housing 3 of the stator 4 is connecting to a housing 8 for the connection rod 7. The housing is formed by pipe sections connected by pin and box joints used in the drilling art. The connecting rod is connected to the rotor 5 by means of universal joints 6 and connected to the hollow shaft 9 by universal joints 6. The hollow shaft is provided with ports 10 and positioned within radial bearing 11, provided with flow passageways such as described in the above Garrison patents and supported on an upper thrust bearing 17 and lower thrust bearings 81, 82, 83 and 84, which transmit the load of the housing 8 and conventional drill collars through the shoulder 85 to the drill 86 in a manner such as is shown in my co-pending application, Ser. No. 388,586.

Mounted on the shaft (see FIG. 2) below the radial bearing 11 are nuts 12 and 13, held securely against vertical displacement by split rings 14 and 15. When the bit 86 is on bottom, the housing 8, connecting to the housing 3, loads the lower thrust bearings 81–84 onto the bit, as will be described below. In this condition, a space 16 is provided between the nut 13 and the race 17 of the upper thrust bearing, of which 18 is the lower race. The load of the shaft, therefore, is not imposed upon the upper thrust bearing race 17.

The races 17 and 18 are spaced radially from shaft 9. The race 18 is secured against rotation by the pin 19, which fits into a ring 20 (see FIGS. 2, 3 and 8), which is end-notched at 23 (see FIG. 7). The notch 23 seats on the end of pin 33 of the housing 8. The ring 20 has a skirt 22, which is notched at 24, and is provided with a bore 21, into which the pin 19 fits. Mounted at the pin 33 is the sleeve 25, carrying dogs 26, which fit into the notches 24. The sleeve 25 carries an external "0" ring seal 27, which seals the ring against the pin 33. It carries an internal circumambient groove 28, into which is fitted a ring of hard material such as tungsten carbide, boron nitride, silicon carbide, alumina and other hard material, for example, of in excess of Knoop or Vickers hardness of about 2000. Materials, such as tungsten carbide and alumina, may be formed into a solid cylinder or be formed by dispersion of particles of such materials, including diamond particles in a metallic matrix.

The flow resistor elements of my invention may be fabricated by standard techniques from tungsten carbide or ceramic material, such as alumina. A preferable material is the metal-bonded hard particles, such as have been employed in the abrader arts.

The methods for producing shapes of metal-bonded hard materials, such as referred to above, are described in the Wilder et al U.S Pat. Nos. 3,757,878; 3,757,879; and 3,841,852.

The particles of hard material, such as described above, may be dispersed in a metal matrix powder and introduced into a mold of desired shape. The temperature of the mold is raised to fuse the metal and bond the particles. The particles of hard material, for example, of Knoop hardness in excess of 2000 are dispersed and held in the metal matrix, such as copper-based alloys, such as brass or bonze alloys, and copper-based alloys containing alloying metal, such as one or more of the following: nickel, cobalt, tin, zinc, manganese, iron, and silver. The matrix-bonded material has suitable compressive and impact strength and micro-hardness (see Wilder U.S. Pat. No. 3,841,852, col. 7, line 53, et seq.).

The sleeve 25 is provided with diametrically spaced notches 30, into which pins 31 fit, the pins 31 being set in diametrically positioned bores 32 in the housing 8, to prevent rotation of the sleeve 25.

The complementary member of the flow restrictor, of which 29 is a part, is formed of a sleeve 43, which is mounted on the shaft 9 between rings 42 and 48. Ring 42 fits into the notch 46 in the sleeve 43 and ring 48 fits into the notch 47 in sleeve 43. The complementary ring 41 fits into the notch 40 of sleeve 38. The rings 41, 42, 48 and 49 are made of hard material such as described above. We prefer to use tungsten carbide. The ring 34, sealed by 0 ring 35, is held against vertical displacement by the split ring 38a, which fits into a notch in shaft 9. The ring 34 is bored with a number of circular spring retaining bores 36, which contain a number of coil springs 37, which bear against the notch 39 of ring 38. The lower ring 49 fits into notch 51 of ring 50, which is held secured to the shaft by means of split ring 54, set in a suitable key slot in the shaft and fits into the notch 53.

Figure 6:
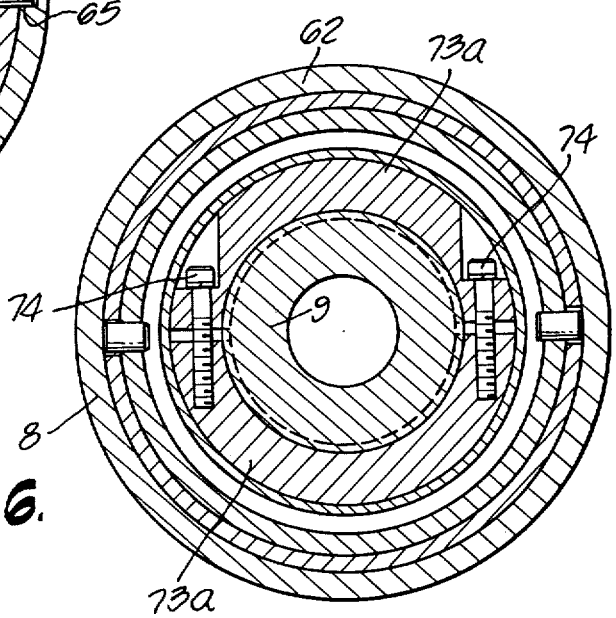
FIG. 6 is a sectional view on line 6—6 of FIG. 2.
Figure 4:
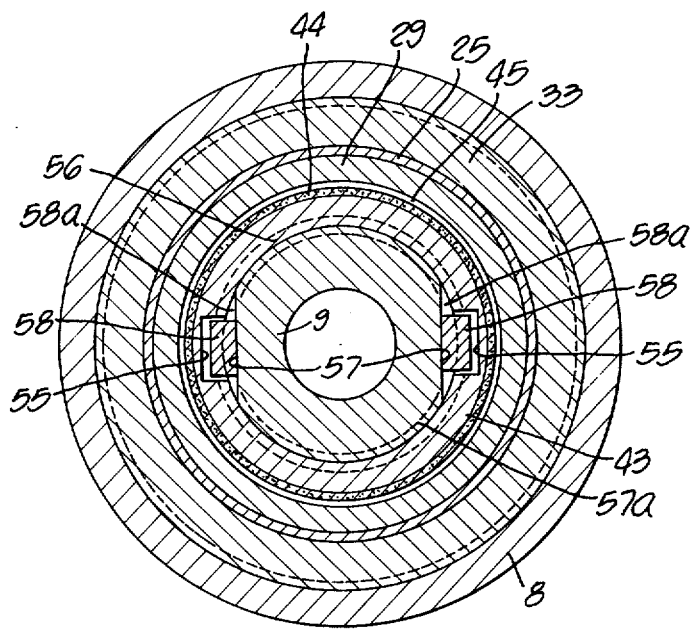
FIG. 4 is a sectional view on line 4—4 of FIG. 2.
Figure 10:
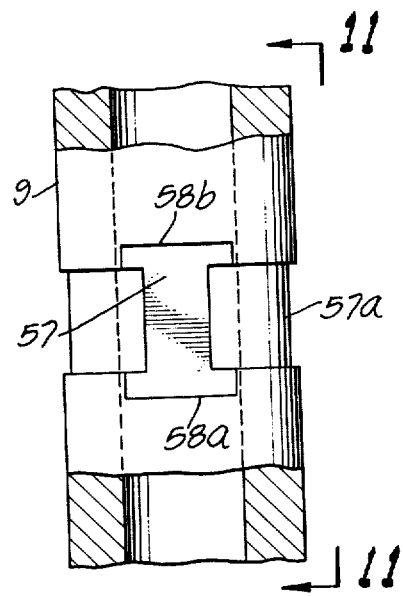
FIG. 10 is a section on line 10—10 of FIG. 2.
Figure 9:
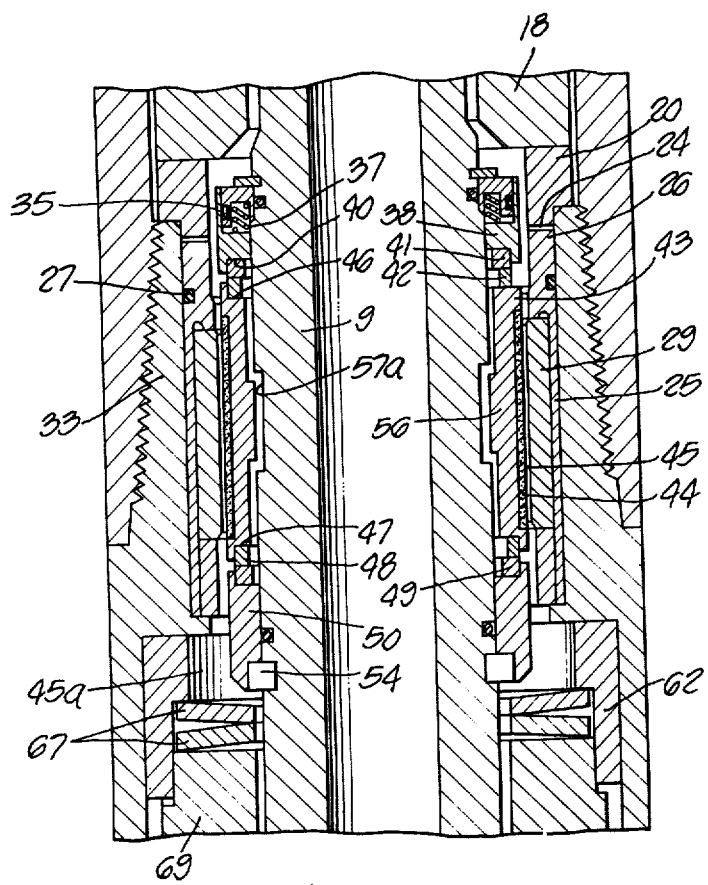
FIG. 9 is a section similar to FIG. 2, but taken 90° from the section of FIG. 2.
Figure 11:
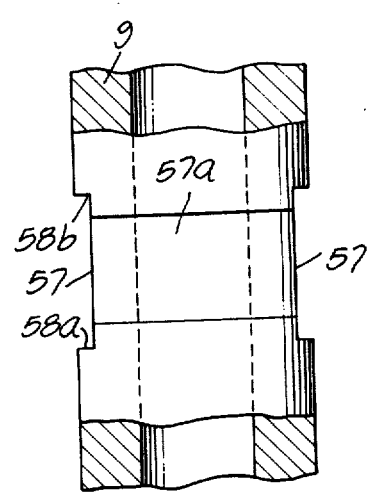
FIG. 11 is a fragmentary plain view on line 11—11 of FIG. 10.

It will be seen (see FIGS. 2, 3 and 8) that in each of the lower bearings the pressure transmitting ring 62, which engages the Belleville spring 67, carries a slot 66, into which is fitted a pin 64, which is positioned in the bore 65 in the housing 8. The thrust sleeve 62 is provided with notch 67a. The upper race 69 is held against rotation by the pins 69a, which fit into the slots 67a. The lower race 70 sits on ring 72 and is held against rotation by pin 71 in ring 72 keyed to the shaft 9 by the key 73. The ring 72 sits upon the split nut 73a, screwed on the shaft 9 and secured by bolt 74 (see FIG. 6). The lower bearings 82, 83 and 84 are similarly constructed and secured to the shaft and housing.

The shaft is formed with a circumambient groove 57a, and with diametrically opposed I-shaped flat section 57 (see FIGS. 2, 4, 9 and 10). Keys 58 are placed against the flats 57 and retained between the shoulders 58a and 58b, formed as segments at the flats. The depth of the key slots 55 and the radial dimension of the key slot 55 are such that the key 58, when against the flat on the shaft, is positioned between the sides of the slot 55. The bossage 56 is of depth so that it fits in the groove 57a (see FIGS. 4 and 9) and is spaced therefrom at the sides and also at the end of the bossage 56 (see FIG. 4 and FIG. 9). In assembly, the sleeves 43 may be slid over the shaft, the slot 55 passing over the key to be seated on ring 48.

The sleeve 43 is rotated by the shaft through the key 58, which engages the sides of the slot 55 in sleeve 43. However, the surface of the facing 44, when the shaft is concentric with the housing, is not in frictional engagement with the surface of 29 (see FIGS. 2 and 7). It will require substantial radial displacement of the shaft to cause the surface to contact, and this area of contact will be limited.

The above construction provides a passage of fluid discharging from the stator into the ports 10 and the hollow shaft and through the nozzles into the bit, into the annulus. A portion of the stator discharge passes through the vertical passageway grooves of the marine type bearing 11 (see above) and passes through the annulus and past the thrust-bearing races 17 and 18. It then moves through the annular passageway 45 between the hard-faced sleeves and through the lower bearing housing through the open-ended housing adjacent to the bit 86 to discharge into the annulus about the drill string. A suitable construction of the lower thrust-bearing housing is described in my co-pending application, Ser. No. 388,586 which is incorporated herein by this reference.

The annular passageway 45 is made small, sufficient to reduce the pressure at the discharge end of the annular passageway 45 at 45a at the head of the upper bearing 69 to a few pounds above annulus pressure, sufficient to flow the mud discharge from the annular passageway 45 through the lower end of the housing against the back pressure of the fluid passing up the annulus to the surface of the bore hole.

In order to hold the bypass flow through the annular passageway to a small fraction of the stator discharge, the resistance to the bypass flow must be much greater than that through the hollow tube 8. Depending on the diameter of the shaft and housing, the radial dimension of the annulus 45 may be in the order of 0.001 to 0.010 inch. These dimensions are not limiting and are intended only as an order of magnitude.

The pressure drop imposes a larger force on the head of the ring 34, which is resisted by the ring 54. This force, when operative, and springs 37, when the unit is not in use, retain the sleeve 25 between the rings 42 and 48. The rings 42 and 41, as are also rings 48 and 49, are of internal diameter greater than the external diameter of the shaft. The contacting surfaces of the rings 41 and 42, as are also rings 48 and 49, are polished and can slide over each other. The radial dimension of the annular space 47 between the sleeve 43 and the housing is much greater; for example, 20 to 50 times the radial dimension of the annular space.

Figure 7:
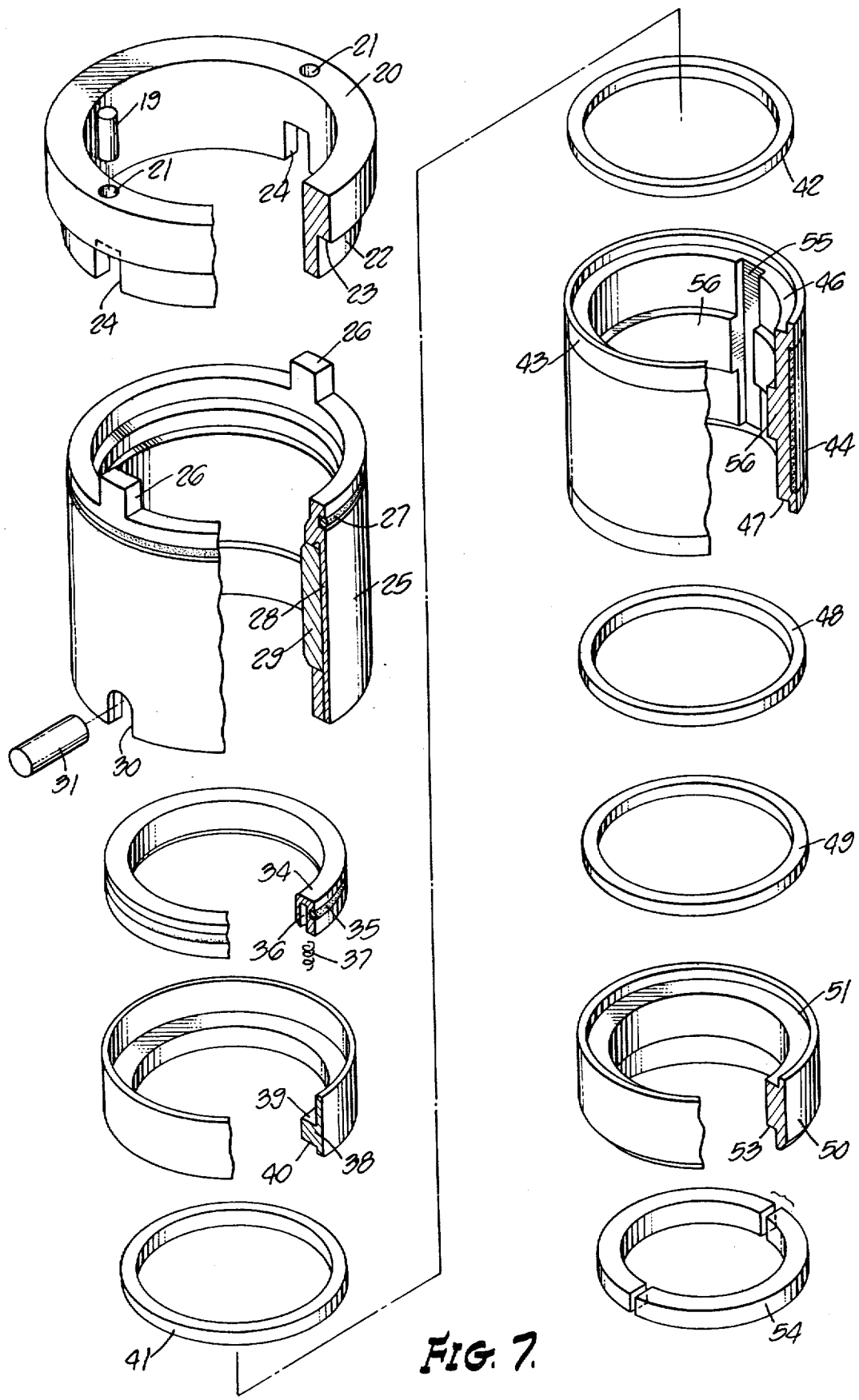
FIG. 7 is a perspective view of elements of the invention shown in FIG. 2.

Should the shaft exercise a transverse motion due to asymmetrical moments, it will cause a sliding motion between rings 41 and 42 and as between 48 and 49. If this occurs so as to move the hard face 44 against hard face 29, the contact will occur substantially on a line, as results when two concentric cylinders of different diameter are displaced so that the outer surface of the inner cylinder contacts the inner surface of the outer cylinder. The cross-sectional area of the annular space 45 is not altered. Since the radial dimension of the annulus 45 is so small, the flow impedance through the annulus is not altered to a substantial degree. The pressure drop is not affected to a substantial degree. It is to be noted that, due to much greater radial dimension of the space 55 than that of 45, the shaft can made a radial excursion much greater than the radial dimension of the annulus 45 before the shaft contacts the bossage 56 (FIG. 7). That is represented by the radial dimension of 45. The fact, under normal operations, the closure of the gap of annulus 45 would not be expected. Thus the shaft in its transverse displacement will permit the impact of the hard material to be minimized, and thus fracture of the material, which may be brittle, is normally avoided.

It is to be noted that the sleeves 47 and 29 are not relied on to provide a radial bearing support, and that the shaft is not restrained at this point against radial displacement. Radial bearings are provided at other positions of the shaft structure as described above. Reference may be had to co-pending applications, Ser. Nos. 388,586 and 433,284 for suitable bearings in addition to those disclosed in the above Garrison patents.

Figure 8:
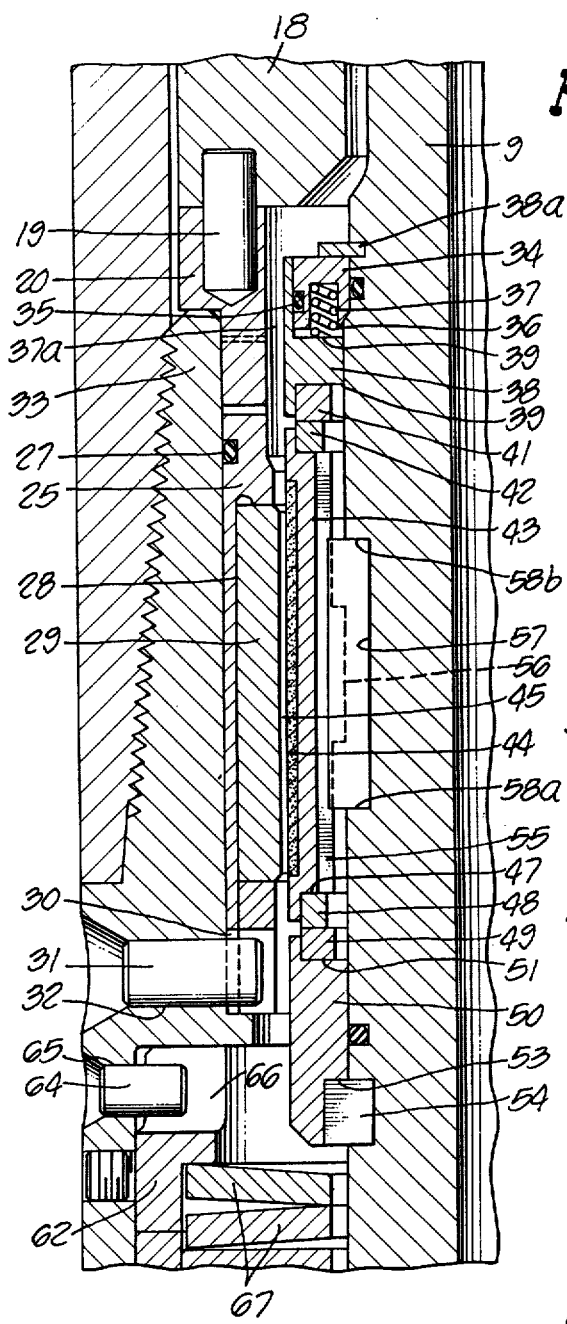
FIG. 8 is an enlarged view of a section of FIG. 2 on line 2—2 of FIG. 1.
Figure 12:
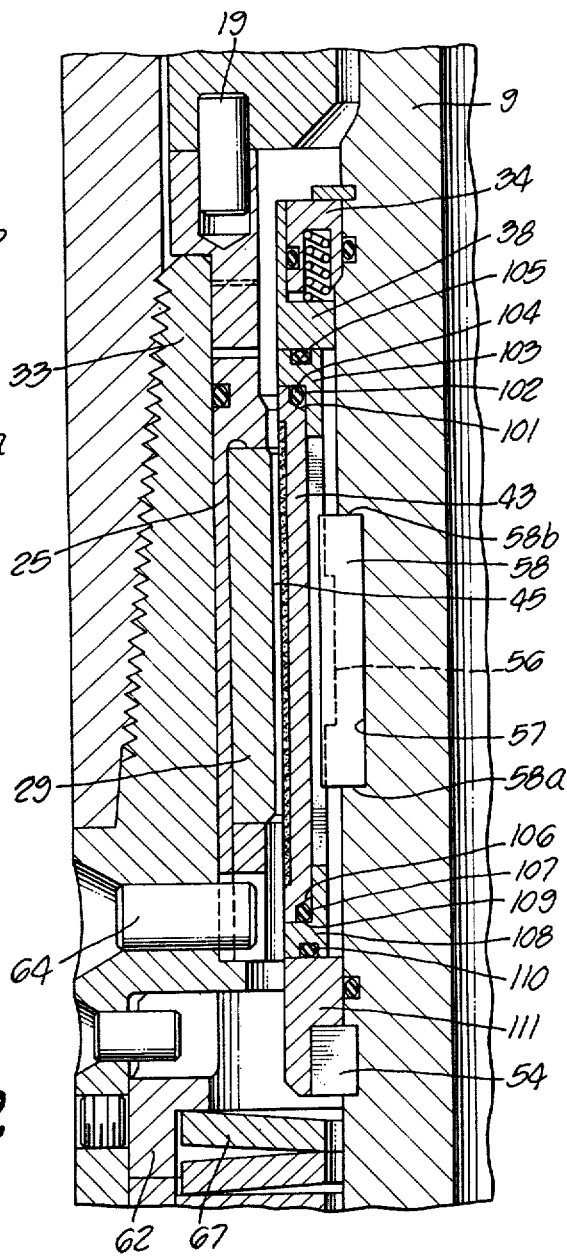
FIG. 12 is a section similar to FIG. 8 of a modification of my invention.

FIG. 12 shows a modification of the flow restriction of FIGS. 2 and 8. The difference resides in the mounting of the sleeve 25. The form shown in FIG. 8 presents a hazard should the rings 41, 42, 48 and 49 wear. It may then be possible that mud may squeeze into the annulus 55. The form shown in FIG. 12 provides for a seal. The sleeve 43 is edge-notched at 101 and 106 to contain 0 rings 102 and 107. The sleeve is mounted in ring 103 at the shoulder 104, and in ring 108 at the shoulder 109. The ring 103 carries an 0 ring 105 and is in slidable contact with the ring 38. In like manner, the ring 108 carries 0 rings 110 and is in slidable contact with ring 111 held by 54, as in FIG. 8. The form of FIG. 1 is otherwise constructed and operates as in FIG. 8, and the same numbers identify identical parts.

Figure 13:
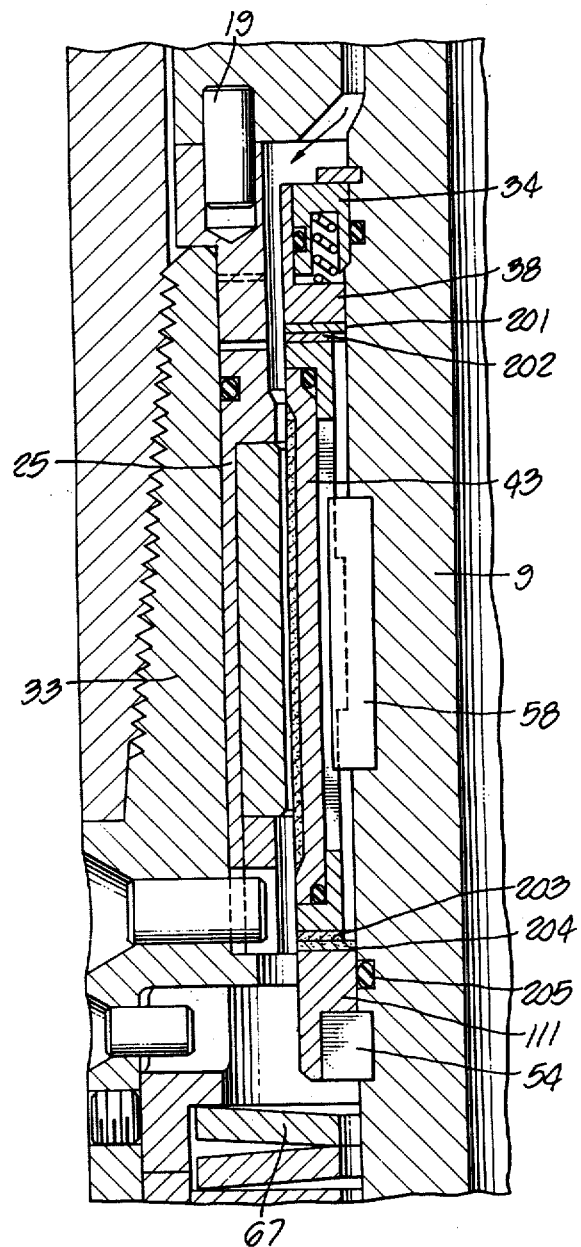
FIG. 13 is a section similar to FIG. 8 of another modification of my invention.

FIG. 13 is constructed and operates as in FIGS. 8 and 12, and the same parts bear like numbers. The difference is in the sliding arrangement of the sleeve 43. Instead of the rings 41, 42, 48 and 49 of FIG. 8, I provide hard-material, polished flat rings 201, 202, 203 and 204. Rings 202 and 203 are of greater internal diameter than the external diameter of the shaft. The ring 201 is slidably mounted on ring 202 and ring 203 is slidably mounted on ring 204.

Figure 14:
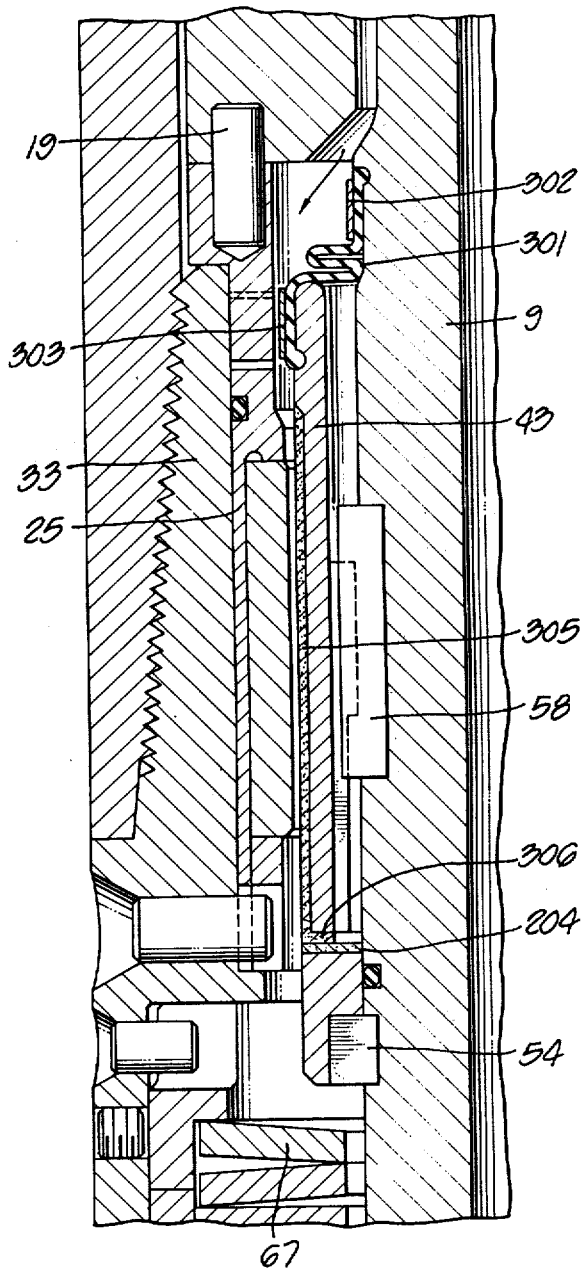
FIG. 14 is a section similar to FIG. 8 of another modification of my invention.

FIG. 14 is similar to the form of FIG. 13. The upper end of the sleeve 43 is connected to the drive shaft by a circular corrugated boot 301 secured to the drive shaft by strap 302 and to the end of the sleeve 43 by a strap 303. The hard facing 305, similar to 44, is not set in a notch but is applied and extends over the external surface of the sleeve 43, with a flange 306, which is in slidable engagement with the ring 204.

My presently preferred embodiment of my invention is illustrated in FIGS. 2–11.

We claim:

1. A hydraulic motor including a stator in a housing and a rotor in said stator, a shaft connected to said rotor, a fluid inlet to said stator, and a fluid outlet from said stator, a thrust bearing mounted on said shaft and housing, a fluid passageway connected to the fluid outlet from said stator through the housing, a flow restrictor positioned in said passageway between the stator outlet and said thrust bearing, said flow restrictor comprising a first sleeve mounted on said shaft, support means for said first sleeve mounted on said shaft for radial displacement of said sleeve with respect of said shaft, a second sleeve mounted on said housing adjacent to but spaced from said first sleeve.

2. The motor of claim 1, said support means for said sleeve including a first support ring mounted on said shaft, a first pair of rings mounted between one end of said sleeve and said first support ring, a second support ring mounted on said shaft, a second pair of rings mounted between said sleeve and said second support ring at the other end of said sleeve, the rings of each of said pairs slidably mounted over each other.

3. The motor of claim 1, in which the mounting of the first sleeve includes a first ring mounted on the shaft at one end of said sleeve, said first sleeve mounted in sliding relation to said first ring.

4. The motor of claim 3, said support means including a second ring mounted on said shaft at the other end of said first sleeve in sliding relation to said first sleeve.

5. The motor of claim 2, in which the other end of said first sleeve is connected to said shaft by a flexible boot.

6. The motor of claim 1, in which the facing surfaces of said sleeves are formed of hard material having a Knoop hardness in excess of about 2,000.

7. The motor of claim 6, in which the hard material is tungsten carbide.

8. The motor of claim 6, in which the mounting of the first sleeve includes a first ring mounted on said shaft at one end of said first sleeve, said first sleeve mounted in sliding relation to said first ring.

9. The motor of claim 8, in which said ring is made of hard material having a Knoop hardness in excess of 2,000.

10. The motor of claim 8, in which the material of said ring is tungsten carbide.

11. The motor of claim 8, said support means including a second ring mounted on said shaft at the other end of said first sleeve in sliding relation with said first sleeve.

12. Motor of claim 11, in which said rings are made of hard material having a Knoop hardness in excess of 2,000.

13. The motor of claim 11, in which the material of said rings is tungsten carbide.

14. The motor of claim 8, in which the other end of said first sleeve is connected to said shaft by a flexible boot.

15. The motor of claim 14, in which said ring is made of hard material having a Knoop hardness in excess of 2,000.

16. The motor of claim 15, in which the hard material is tungsten carbide.

17. The motor of claim 6, said support means for said sleeve including a first support ring mounted on said shaft, a first pair of rings mounted between one end of said sleeve and said first support ring, a second support ring mounted on said shaft, a second pair of rings mounted between said sleeve and said second support ring at the other end of said sleeve, the rings of each of said pairs slidably mounted over each other.

18. The motor of claim 17, in which said rings are made of hard material having a Knoop hardness in excess of 2,000.

19. The motor of claim 18, in which the hard material is tungsten carbide.

* * * * *

PO-1050
(5/69)

UNITED STATES PATENT OFFICE
CERTIFICATE OF CORRECTION

Patent No. 3,936,247      Dated February 3, 1976

Inventor(s) JOHN E. TSCHIRKY and GARY MONROE CRASE

It is certified that error appears in the above-identified patent and that said Letters Patent are hereby corrected as shown below:

Column 7, line 32, change "The" to - In - .

Claim 5, line 1, change "2" to - 3 - .

Signed and Sealed this eighteenth Day of May 1976

[SEAL]

Attest:

RUTH C. MASON
Attesting Officer

C. MARSHALL DANN
Commissioner of Patents and Trademarks